United States Patent
George et al.

(10) Patent No.: US 11,025,776 B2
(45) Date of Patent: Jun. 1, 2021

(54) INTERACTION DETERMINED AUTO-ANSWER TIME

(71) Applicant: Avaya Inc., Santa Clara, CA (US)

(72) Inventors: Jibin George, Pune (IN); Salil Dhawan, Pune (IN); Sandeep Goynar, Pune (IN); Harsimran Jeet Singh, Pune (IN)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/510,675

(22) Filed: Jul. 12, 2019

(65) Prior Publication Data

US 2021/0014356 A1    Jan. 14, 2021

(51) Int. Cl.
*H04M 3/51* (2006.01)
*H04M 3/428* (2006.01)
*H04M 3/523* (2006.01)

(52) U.S. Cl.
CPC ....... *H04M 3/5166* (2013.01); *H04M 3/4285* (2013.01); *H04M 3/5183* (2013.01); *H04M 3/523* (2013.01)

(58) Field of Classification Search
None
See application file for complete search history.

(56) References Cited

U.S. PATENT DOCUMENTS

| | | | |
|---|---|---|---|
| 8,634,543 B2 | 1/2014 | Flockhart et al. | |
| 2004/0174980 A1* | 9/2004 | Knott | H04M 3/5166 379/266.01 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2016/0212266 A1* | 7/2016 | Soundar | H04M 3/5158 |

* cited by examiner

*Primary Examiner* — Antim G Shah
(74) *Attorney, Agent, or Firm* — Sheridan Ross P.C.

(57) ABSTRACT

Agents in a contact center are often connected to communications (e.g., calls, real-time text chats) automatically and without human intervention. By analyzing the communication and/or a history associated with the customer on the communication, an auto-answer delay may be determined that is better able to provide the agent with sufficient time to prepare for the communication. The auto-answer delay may be determined as a variation from a default auto-answer delay.

20 Claims, 7 Drawing Sheets

| Complexity | Add |
|---|---|
| Complexity 1 | -5% |
| Complexity 2 | zero |
| Complexity 3 | +5% |
| Complexity 4 | +10% |

| Topic Id. | Complexity cat. |
|---|---|
| Topic 1 | Complexity 1 |
| Topic 2 | Complexity 3 |
| Topic 3 | Complexity 3 |
| Topic 4 | Complexity 4 |
| Topic 5 | Complexity 1 |
| Topic 6 | Complexity 2 |
| Topic 7 | Complexity 4 |

| Agent | Expertise |
|---|---|
| Topic 1 | Expert |
| Topic 2 | Expert |
| Topic 3 | Advanced |
| Topic 4 | Basic |
| Topic 5 | Basic |
| Topic 6 | Minimal |
| Topic 7 | Minimal |

*Fig. 6*

| | Complexity 1 | Complexity 2 | Complexity 3 | Complexity 4 | Complexity 5 |
|---|---|---|---|---|---|
| Expert | 0 | 3% | 6% | 10% | 13% |
| Advanced | 5% | 7% | 9% | 12% | 15% |
| Basic | 10% | 12% | 17% | 21% | 26% |
| Minimal | 20% | 25% | 30% | 40% | 50% |

Fig. 7

| Events $_{702}$ | Additional time $_{704}$ |
|---|---|
| 0 | 0 | 706A
| 1-2 | 30 sec. | 706B
| 3-4 | 1 min. | 706C
| 5-6 | 90 sec. | 706D
| 6-10 | 2 min. | 706E
| 11+ | 3 min. | 706F $_{700}$

Fig. 8

| Length (Words) $_{802}$ | Additional time $_{804}$ |
|---|---|
| 0 | zero | 806A
| For ever 100 | 15 seconds/each 100 | 806B
| Over 1000 | 20 second/each 100 | 806C $_{800}$

INTERACTION DETERMINED AUTO-ANSWER TIME

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for connecting nodes on a network for communication and particularly to the timing of automatic connects with a selected communication node.

BACKGROUND

Contact centers utilize a variety of telecommunications functions and features to increase efficiency and assist the agent in resolving interactions with customers as effectively and efficiently as possible. An auto-answer system may be utilized to automatically answer a telephone call on behalf of the agent and, as a result, require no action on the agent's part in order to be connected with the customer. Auto-answer may occur after a set number of rings. Auto-answer quickly connects the customer's call with the agent and avoids the manual step of answering (i.e., taking the ringing phone off hook).

SUMMARY

Prior art systems may auto-answer a call as soon as agent is available, or within a default, but static auto-answer time. Auto-answer time may allow an agent to review a history or otherwise prepare for the call, however, static systems only allow a single auto-answer time regardless of the pre-call workload. There are times when an agent is in the process of going through a complex or lengthy set of details regarding a customer or customer ticket, including various interactions that may have previously occurred for the ticket. If the call is auto-answered, the agent may be required to use variable customer-agent interaction time to come to terms with the customer problem or request. At times, customer may have called multiple times for an issue and may have significant interaction history associated with a particular issue (e.g., prior ticket(s)).

Customers are often frustrated by agents, upon being connected to the agent before having sufficient time to review the customer's history, who present prospective solutions that have already been considered or performed. From the customer perspective, it dampens first impression of agent's capability to resolve the problem. The agent's voice may be jittery (because of lack of preparedness), divided concentration in listening to the customers while attempting to review the history, inconveniencing first explanation to begin with about probable solution, putting call on hold only after couple of seconds to look for some information to name a few. This has a negative impact on customer about the agent's capability to resolve customer query and often leads to increased resolution time.

The prior art systems fail to allow sufficient time for the agent to more fully prepared and have a more efficient and meaningful conversation with the customer. Similarly, the customer experience is hampered due to lack of preparedness which eventually leads to increased call resolution time and may decrease resolution, which may lead to more call-backs.

In one embodiment, the foregoing problems may be solved and the state of the art advanced by providing a solution that dynamically determines an auto-answer time. Embodiment may incorporate agent communications devices, and in particular, omnichannel agent desktops, that provide the agent with data and connectivity to enable the agent to be better informed and provide improved call resolution. The auto-answer time is dynamically determined based on one or more criterion. Examples include, but are not limited to, the combination of the current (i.e., upcoming) customer call context and the selected agent statistics (e.g., fatigue factor, agent workload since login into that shift session, time spent on previous call, sentiment analysis, agent skill level to name a few). Based on these criteria's, system will determine the time required for auto answering the specific call.

One criterion is the context of the call, which can have factors like number of touch-points the customer already has had on a customer journey map (e.g., how many times customer has already contacted the contact center and through which channels). Other point can be the difficulty level of the issue for which the customer is calling or whether the calling customer is priority customer. Multiple data points may be combined or weighted when compounding criteria is utilized.

Another criterion is the agent's statistics based on their past performance and interactions, which may determine, in whole or in part, how ready the agent is to handle the call and the amount of time needed before the call should be auto-answered. For example, an agent that is just coming out from a very long call, having an unusually busy shift, the agent's skill level, and agent's sentiment analysis, and/or other agent metric may be utilized in considering the auto-answer time.

In another embodiment, the auto-answer time may have a configurable maximum or minimum duration, which may be static or dynamic, such as determined in whole or in part by contact center activity, individual skill levels, etc. The auto-answer time may be presented to the agent, such as in the form of a countdown timer.

In another embodiment, the auto-answer time, or a portion thereof, may be altered automatically based on historic events. For example, an agent handles a multitude of calls over a period of time. A number, preferable a statistically significant large number, of a calls are analyzed to determine if the agent is in need of more or less time before the auto-answer. This may be for a particular agent or skill (calls regarding one subject need more time than calls regarding another subject). Alternatively, the auto-answer time may be reduced and the impact of the reduction analyzed to determine the effect, if any. If there is no adverse effect, the reduction may be made permanent for the agent and/or the subject matter.

If the result of the calls can be categorized based on the success (or lack thereof), such as determined by the duration of calls compared to a normal duration, increased/decrease number of call-backs, customer survey, customers explicit statements of satisfaction/dissatisfaction, etc.. The result may be classified into lesser, neutral, or higher success rate for a particular auto-answer time for the agent and/or subject matter. If system finds certain agents to not see meaningful improvements, (i.e., neutral or negative success) then system either can revert to a prior setting or default static auto-answer time. Agent that have improved success with the dynamic auto-answer time, may continue to do so.

In another embodiment, customers who are waiting longer on hold may be presented with queue music or other announcements and once, the agent is selected, customer may be presented with a ring-back signal. If the ring-back time is increased the queue music or announcement can also be increased accordingly. For example, if a default answer time is 2 seconds and the auto-answer time is calculated to be 8 seconds, and additional 6 seconds of queue music can be inserted.

One benefit of the embodiments presented herein allows for the agents to be better prepared, by having additional time when necessary, prior to being connected to the customer. Another benefit of the embodiments allows customers to be connected to an agent, who is prepared to discuss the issue with reduced or no redundant discussions. If overall call resolution time is quickened, the contact center may leverage the result by deploying fewer resources that would otherwise be necessary to successfully process the calls.

These and other needs are addressed by the various embodiments and configurations of the present invention. The present invention can provide a number of advantages depending on the particular configuration. These and other advantages will be apparent from the disclosure of the invention(s) contained herein.

In one embodiment, a method for automatically connecting a node to a network is disclosed, comprising: connecting a communication with a customer utilizing a customer communication device to first component of the system via the network, wherein the first component automatically answers the communication and places the communication on hold; selecting an agent from a pool of agents to be connected to the communication; accessing an auto-answer delay, wherein the auto-answer delay is associated with an attribute of at least one of the customer or communication to indicate a determined amount of time the agent will be allocated to review a history associated with at least one of the customer or the communication before the communication will be auto-connected with the customer; presenting an agent communication device, associated with the agent, with the history; and automatically connecting the agent communication device with the customer communication upon expiration of the auto-answer delay.

In another embodiment, a system for automatically connecting a node to a network is disclosed, comprising: a communication routing device comprising an interface to the network; a server comprising a memory and at least one processor to execute machine-readable instructions; an automated communication device; and an agent communication device; and wherein the communication routing device, upon being connected to a customer communication device via the network, connects the communication to the automated communication; wherein the server selects an agent from a pool of agents to be connected to the communication; wherein the server accesses an auto-answer delay, wherein the auto-answer delay is determined by an attribute of at least one of the customer or the communication and indicates a determined amount of time the agent will be allocated to review a history associated with at least one of the customer or the communication; wherein the server presents an agent communication device, associated with the agent, with the history; and wherein the server, upon expiration of the auto-answer delay automatically transfers the communication to connect the agent communication device with the customer communication device and disconnects the automated communication device.

In another embodiment, a system for automatically connecting a node to a network is disclosed, comprising: means for connecting a communication to an automated communication, upon being connected to a customer communication device via the network; means for selecting an agent from a pool of agents to be connected to the communication; means for accessing an auto-answer delay, wherein the auto-answer delay is determined by an attribute of at least one of the customer or the communication and indicates a determined amount of time the agent will be allocated to review a history associated with at least one of the customer or the communication; means for presenting an agent communication device with the history; and means for, upon expiration of the auto-answer delay, automatically transferring the communication to connect the agent communication device with the customer communication device and disconnects the automated communication device.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures:

FIG. 3 depicts a first data structure in accordance with embodiments of the present disclosure;

FIG. 4 depicts a second data structure in accordance with embodiments of the present disclosure;

FIG. 5 depicts a third data structure in accordance with embodiments of the present disclosure;

FIG. 6 depicts a fourth data structure in accordance with embodiments of the present disclosure;

FIG. 7 depicts a fifth data structure in accordance with embodiments of the present disclosure;

FIG. 8 depicts a sixth data structure in accordance with embodiments of the present disclosure;

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
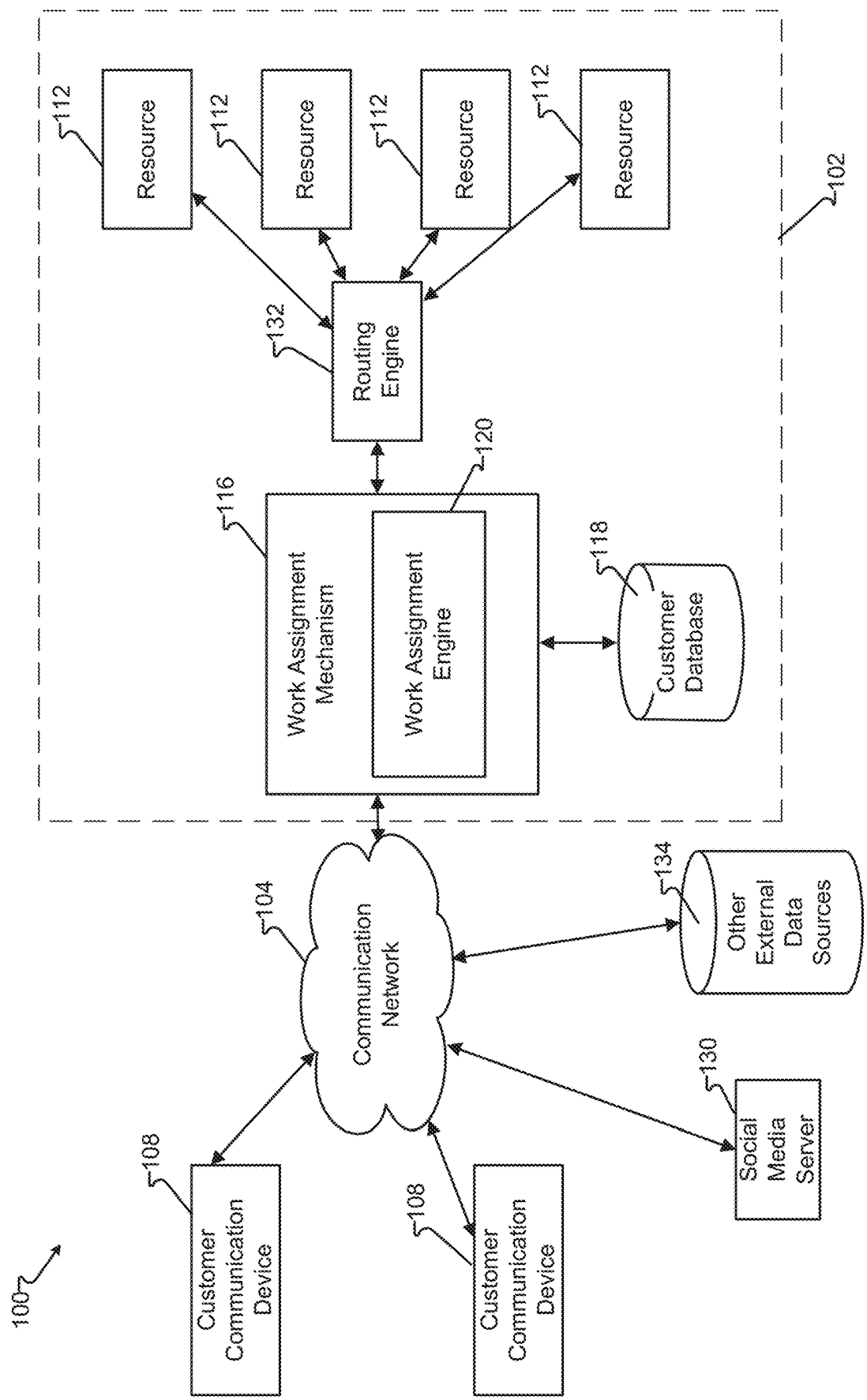
FIG. 1 depicts a first system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server 130. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage elements may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
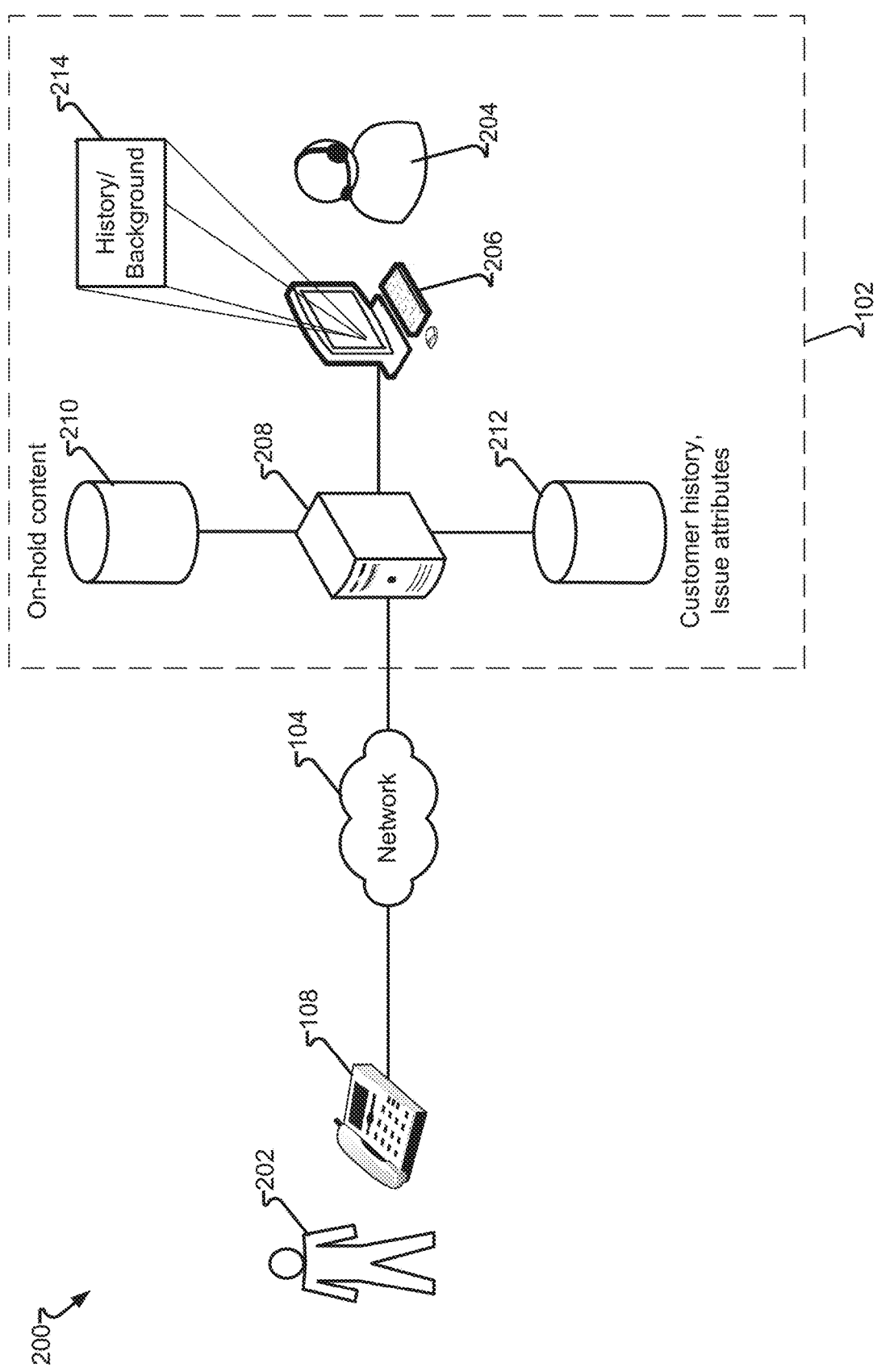
FIG. 2 depicts a second system in accordance with embodiments of the present disclosure.

FIG. 2 depicts system 200 in accordance with embodiments of the present disclosure. In certain embodiments, system 200 comprises or is comprised by at least a portion of system 100. System 200 is embodied as customer communication device 108 utilized by customer 202 to communicate with at least one resource 112 of contact center 102 when resource 112 is embodied as agent 204, being a human agent and not an automated agent, utilizing agent communication device 206 to communicate with customer 202 and optionally receive other information, such as an omnichannel communication device. Customer communication device 108 may be any device operable to convey a real-time communication to and from customer 202, such as voice or video. In another embodiment, customer communication device 108 may be utilized to convey a near real-time communication, such as an interactive text chat with agent 204 via agent communication device 206.

In one embodiment, customer 202 utilizes customer communication device 108 to communicate with agent 204 via agent communication device 206. The communication utilizes communication network and may be initially received by server 208 having at least one processor executing instructions to receive and route the communication. For example, server 208 may execute, work assignment mechanism 116, work assignment engine 120, routing engine 132 is a component or addition to other functions. Server 208 may not be able to connect customer 202 with any agent 204 immediately. For example, all agents, including agent 204, may be currently occupied and the communication may need to be put on hold. Additionally or alternatively, the context of the communication may determine which agent the communication should include. Accordingly, server 208 may place the communication on hold. While on hold customer 202 may be prompted to identify themselves or a particular issue or topic for the communication, such as via execution of an interactive voice response (IVR) on server 208. Accordingly, server 208 may utilize on-hold content database 210 as a repository for content to present and/or receive from customer 202 in order to better route the communication to a particular agent having the skill, authority, etc. necessary to satisfy the reason for the communication. Server 208 may also utilize on-hold content database 210 to access on-hold content (e.g., music, messages, identify alternative methods of communicating with contact center 102, etc.) for presentation to customer 202.

In another embodiment, server 208 may automatically connect the communication to agent communication device 206, thereby connecting customer 202, via customer communication device 108, to agent 204, via agent communication device 206 without any human action. This auto-answer functionality may also disconnect other nodes from the communication, such as server 208 that was providing on-hold content. The auto-answer function may be executed by agent communication device 206 upon receiving an auto-answer signal from server 208 or directly by server 208, which may have a perpetual connection to agent communication device 206. The auto-answer function may be fixed, such as to present history/background presentation 214 to agent 204. However, server 208 may preferably adjust the auto-answer delay to better match the amount of time agent 204 actually needs to review history/background presentation 214 and reduce or eliminate over or under allocating time for history/background presentation 214 to review history/background presentation 214.

Customer 202 may be known to contact center 102, such as by having a non-null entry in customer history and/or issue attributes database 212. In particular, customer history and/or issue attributes database 212 may comprise records of previous communications with customer 202. For example, customer 202 may have a particular technical or other issue that motivated the communication with contact center 102. Accordingly, customer history and/or issue attributes database 212 may maintain a history for presentation to agent 204 as history/background presentation 214. The content of history/background presentation 214 may include attributes of customer 202 (e.g., technically savvy, fair English but fluent in French, frustrated by lack of resolution, etc.), the context of past communications (e.g., unable to reset 'Product A', error code on 'Product B', etc.), and/or a history, such as steps utilized in a previous communication to resolve the current issue (i.e., the motivation for the current communication). The volume of history/background presentation 214 may be trivial (e.g., a few dozen words or less that can be read quickly), substantial (e.g., a large volume of material that may take thirty seconds or longer to read), or complex (e.g., many steps, correct steps that are confusingly similar to incorrect steps, a prior communication history that significantly varied a standard resolution sequence).

In another embodiment, server 208 may comprise on-hold content which may further comprise indicia of the position agent 204 is at within history/background presentation 214. For example, a customer journey is a graphical mapping of significant steps to resolve an issue, perform a transaction, or other customer service process that may be implemented by contact center 102. If agent 204 has ten steps of a customer journey associated with customer 202 to review, which may be known to server 208 to take fifteen seconds to review each step, customer 202 may be presented with on-hold content reflective of such a position. For example, "You will be connected with Agent Smith in two minutes," when eight fifteen-second steps remain to be reviewed. In another example, a volume of text may be presented as history/background presentation 214 and when agent 204 nears the end, server 208 may present on-hold content that includes an announcement, such as, "Thank you for holding, you will now be connect to an agent." After which, agent communication device 206 automatically answers the communication.

As a benefit, agent communication device 206 may auto-answer the communication with customer communication device 108 after providing sufficient time, without excessive time, for agent 204 to review history/background presentation 214 and be prepared to engage with customer 202. As a result, the communication initially comprises customer communication device 108 as one node, and server 208 as a second node, which places the call on hold and optionally provides on-hold content. Following expiration of the auto-answer delay, the communication comprises customer communication device 108 as one node and agent communication device 206 as the second node, without server 208 providing on-hold content. It should be appreciated that server 208 and/or other components may facilitate, monitor, or manage the communication between nodes or, more specifically, end nodes (e.g., customer communication device 108 and agent communication device 206) but not be nodes for the purposes of contributing content (e.g., sound, text, etc.) to the communication.

The benefits of the embodiments described herein, are particularly relevant to real-time communications, such as voice communications where customer 202 is particular sensitive to waiting to engage with agent 204. After customer 202 has been connected with agent 204, and have agent 204 continue to spend time reviewing history/background presentation 214 may be particularly undesirable to customer 202. For example, while on hold, customer 202 may be able to perform other tasks, such as those requiring hearing, comprehension, and/or a level of concentration that could not be performed if customer 202 was connected to agent 204 who was attentive to the silence in the belief that agent 204 could begin speaking at any time and without notice, such as at the conclusion of reviewing history/background presentation 214 without a dynamically determined auto-answer delay as described herein.

It should be appreciated that system 200 may utilize more, fewer, or alternative components to provide the functionality described herein without departing from the scope of the embodiments. For example, on-hold content database 210 and customer history and/or issue attributes database 212 may be combined or combined with other data repositories, including, but not limited to customer database 118. Additionally or alternatively, history/background presentation 214 may be text presented on a display or audibly presented to agent 204. Server 208 may comprise one or more processors. Additionally or alternatively, server 208 may be embodied as a plurality of processing appliances (e.g., servers, blades, etc.) and server 208 may be co-embodied with a server performing other functions, including but not limited to, work assignment mechanism 116, work assignment engine 120, routing engine 132, etc.

FIGS. 3-8 illustrate data structures 300-800 that may be utilized by the at least one processor of server 208 to determine the auto-answer delay value for a particular communication, such as one comprising customer communication device 108. At least one processor of server 208 determines the duration of an auto-answer function, after which, nodes are automatically connected for a communication via a network, such as customer communication device 108 being automatically connected to agent communication device 206 via communication network. The determination of the duration for the auto-answer delay is variously embodied. In one embodiment, the value of the auto-answer delay is determined as an absolute value. In another embodiment, the auto-answer delay is determined as a modification, in terms of percentage or duration, from a previously determined auto-answer delay value, which may be a default value or an otherwise determined value. It should be appreciated that data structures 300-800 may be combined, further fragmented, aggregated with other data structures or otherwise altered without departing from the scope of the embodiments herein.

FIG. 3 depicts data structure 300 in accordance with embodiments of the present disclosure. In one embodiment, server 208 considers the complexity of a particular communication. For example, customer 202 may initially communicate with server 208, such as an IVR, and provide an indication of the subject matter of the communication. Alternatively, server 208 may access customer history and/or issue attributes database 212 and/or customer database 118, and access a record associating customer 202 with a particular issue. Data structure 300 comprises records 306A-D comprising a complexity field 302 and modification value 304. Modification value 304 may be relative, such as the adding of 5% illustrated by record 306C, or absolute (e.g., "add 15 seconds").

FIG. 4 depicts data structure 400 in accordance with embodiments of the present disclosure. Data structure 400 may be utilized in conjunction with data structure 300. In one embodiment, data structure 400 comprises a topic identifier field 402 and an associated complexity field 404 for records 406A-G. For example, server 208 may know, such as customer 202 indicating during an IVR on-hold phase of a communication, that "topic 3" is to be discussed. Server 208 may then access data structure 400 and match "topic 3" in record 406F and thereby determine "Complexity 3" from associated complexity field 404. As a result, five percent more time is added to the auto-answer delay value (see, FIG. 3, record 306C).

FIG. 5 depicts data structure 500 in accordance with embodiments of the present disclosure. The amount of delay utilized in the auto-answer delay may be provided, at least in part, by attributes of the selected agent that will be connected to the communication, via their respective agent communication device. In one embodiment, data structure 500 comprises topic field 502 and associated expertise field 504 for records 506. Data structure 500 may comprise records for each of a plurality of agents, including agent 204, or additional fields to identify the particular agent. Agents that have less skill with respect to a particular topic may require additional time to review the associated history or background (e.g., history/background presentation 214) or access reference materials (e.g., manuals, instructions, reference materials, etc.) prior to being connected to a communication that will discuss that particular topic. Conversely, agents that have a greater degree of skill may not require more time. For example, agent 204 may be enqueued to be automatically connected to a communication to discuss "Topic 3" and server 208 then accesses data structure 500 and record 506C, which has an associated expertise field 504 of "Advanced." Server 208 may then access another data value, to further determine any modifications to the auto-answer delay, such as data structure 600 (see, FIG. 6).

FIG. 6 depicts data structure 600 in accordance with embodiments of the present disclosure. Data structures may be multidimensional where the auto-answer delay is determined (or modified) by the value of two or more attributes. In one embodiment, data structure 600 comprises levels of expertise field 602 and complexity field 604 for a number of records 606. For example, agent 204 may be enqueued for a communication for "Topic 3" which agent 204 has an "Advanced" level of skill (see, FIG. 5, record 506C). However, the amount of time agent 204 needs to prepare to accept the communication may be additionally dependent on the complexity of the particular topic. Accordingly, server 208 may access data structure 600 and determine that the communication will have "Complexity 2" value of complexity field 604, for which agent 204 has "Advanced" skills in expertise field 602 and, therefore, record 606B indicates that 7% should be added to the auto-answer delay value.

FIG. 7 depicts data structure 700 in accordance with embodiments of the present disclosure. The volume of material to review may be determine, in whole or in part, the amount of time needed for agent 204 to review before being joined to a communication. Accordingly, server 208 may access data structure 700 having events field 702. Events field 702 may be a number of times a particular customer has had a communication with contact center 102 or other resource. For example, agent 204 may be enqueued for a communication with customer 202, which has entries in customer history and/or issue attributes database 212 comprising entries for five events. Accordingly, server 208 may access data structure 700 and determine an additional ninety seconds should be added to the auto-answer delay value as indicated by the additional time field 704 of record 706D.

FIG. 8 depicts data structure 800 in accordance with embodiments of the present disclosure. The value, or modification, of the auto-answer delay may be determined, programmatically, such as to determine a value from an enumeration or program, such as when an auto-answer delay value may be determined from an equation or algorithm. One programmatically determined value may be based on the volume of material to review prior to automatically connected an agent to a communication. Data structure 800 comprises length field 802 and additional time field 804 for a number of records 806. Accordingly, volume of materials may determine, in whole or in part, the amount (or modification) of time needed for agent 204 to review before being joined to a communication. Accordingly, server 208 may access data structure 800 having length field 802 and additional time field 804. Length field 802 may be a length or volume of history or background (e.g., pages, word count, stage in a customer journey, etc.). For example, agent 204 may be enqueued for a communication with customer 202, which has entries in customer history and/or issue attributes database 212 comprising one-thousand two-hundred words. Accordingly, server 208 may access data structure 800 and determine from record 806C adds an additional four minutes (i.e., 1,200 words*20 seconds per 100 words=240 seconds=4 minutes).

Figure 9:
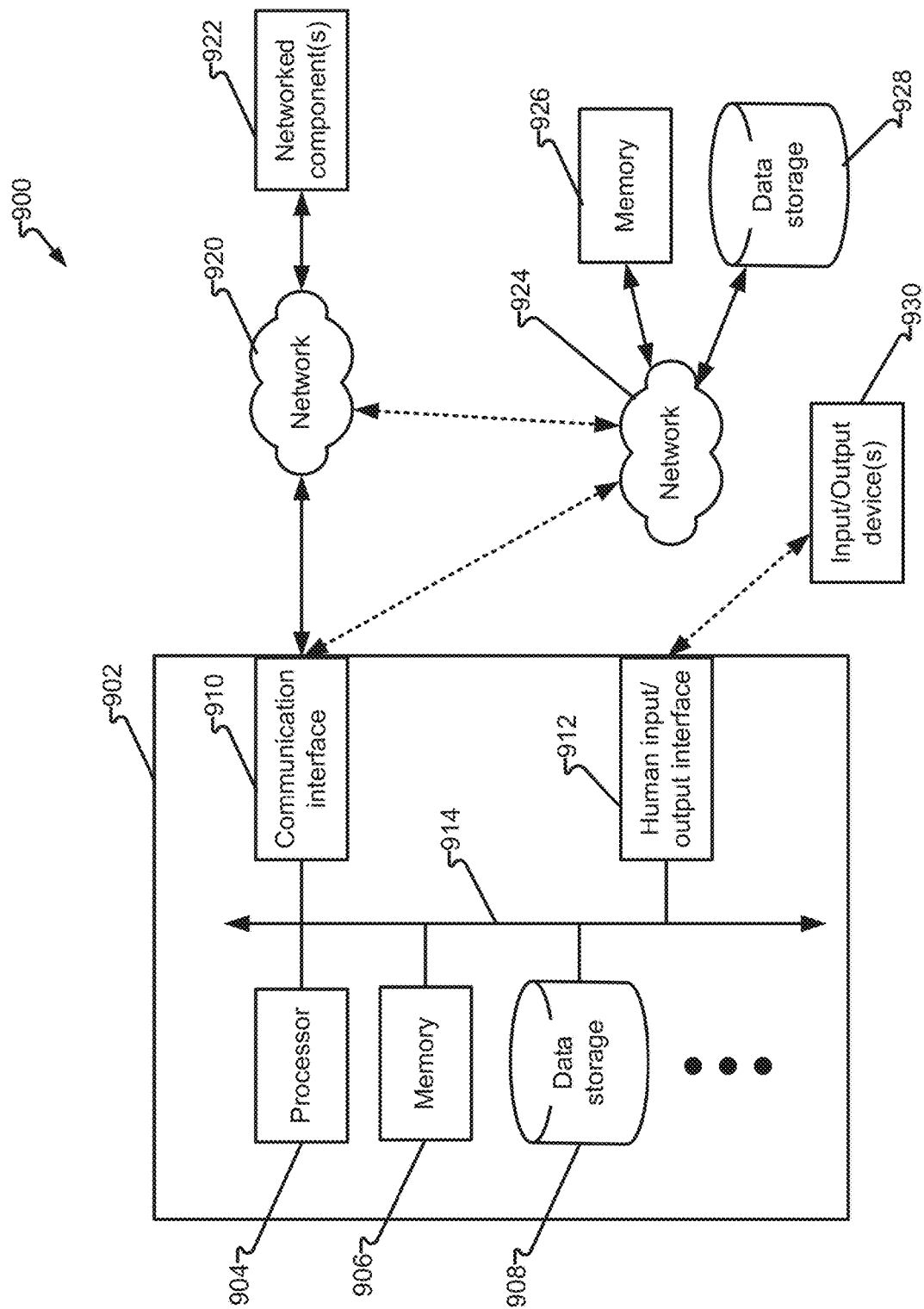
FIG. 9 depicts a device of a system in accordance with embodiments of the present disclosure.

FIG. 9 depicts device 902 in system 900 in accordance with embodiments of the present disclosure. In one embodiment, server 208 may be embodied, in whole or in part, as device 902 comprising various components and connections to other components and/or systems. The components are variously embodied and may comprise processor 904. Processor 904 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 914, executes instructions, and outputs data, again such as via bus 914. In one embodiment, processor 904 is executed on device 902 to receive a communication from one networked component (e.g., customer communication device 108), such as to place the communication on hold and/or obtain certain information, such as by executing an IVR function. Processor 904 may determine an auto-answer delay. Upon expiration of the auto-answer delay, one networked component 922 (e.g., customer communication device 108) is automatically connected to another networked component 922 (e.g., agent communication device 206).

In addition to the components of processor 904, device 902 may utilize memory 906 and/or data storage 908 for the storage of accessible data, such as instructions, values, etc. Communication interface 910 facilitates communication with components, such as processor 904 via bus 914 with components not accessible via bus 914. Additionally or alternatively, input/output interface 912 connects to one or more interface components to receive and/or present information (e.g., instructions, data, values, etc.) to and/or from a human and/or electronic device. Examples of input/output devices 930 that may be connected to input/output interface include, but are not limited to, keyboard, mouse, trackball, printers, displays, sensor, switch, relay, etc. In another embodiment, communication interface 910 may comprise, or be comprised by, input/output interface 912. Communication interface 910 may be configured to communicate directly with a networked component or utilize one or more networks, such as network 920 and/or network 924.

Communication network 104 may be embodied, in whole or in part, as network 920. Network 920 may be a wired network (e.g., Ethernet), wireless (e.g., WiFi, Bluetooth, cellular, etc.) network, or combination thereof and enable device 902 to communicate with network component(s) 922.

Additionally or alternatively, one or more other networks may be utilized. For example, network 924 may represent a second network, which may facilitate communication with components utilized by device 902. For example, network 924 may be an internal network to contact center 102 whereby components are trusted (or at least more so) that networked components 922, which may be connected to network 920 comprising a public network (e.g., Internet) that may not be as trusted. Components attached to network 924 may include memory 926, data storage 928, input/output device(s) 930, and/or other components that may be accessible to processor 904. For example, memory 926 and/or data storage 928 may supplement or supplant memory 906 and/or data storage 908 entirely or for a particular task or purpose. For example, memory 926 and/or data storage 928 may be an external data repository (e.g., server farm, array, "cloud," etc.) and allow device 902, and/or other devices, to access data thereon. Similarly, input/output device(s) 930 may be accessed by processor 904 via input/output interface 912 and/or via communication interface 910 either directly, via network 924, via network 920 alone (not shown), or via networks 924 and 920.

It should be appreciated that computer readable data may be sent, received, stored, processed, and presented by a variety of components. It should also be appreciated that components illustrated may control other components, whether illustrated herein or otherwise. For example, one input/output device 930 may be a router, switch, port, or other communication component such that a particular output of processor 904 enables (or disables) input/output device 930, which may be associated with network 920 and/or network 924, to allow (or disallow) communications between two or more nodes on network 920 and/or network 924. For example, a connection between one particular customer, using a particular customer communication device 108, may be enabled (or disabled) with a particular networked component 922, such as agent communication device 206. Similarly, one particular networked component 922, such as agent communication device 206, may be enabled (or disabled) from communicating with another particular networked component 922 and/or customer communication device 108. Ones of ordinary skill in the art will appreciate that other communication equipment may be utilized, in addition or as an alternative, to those described herein without departing from the scope of the embodiments.

Figure 10:
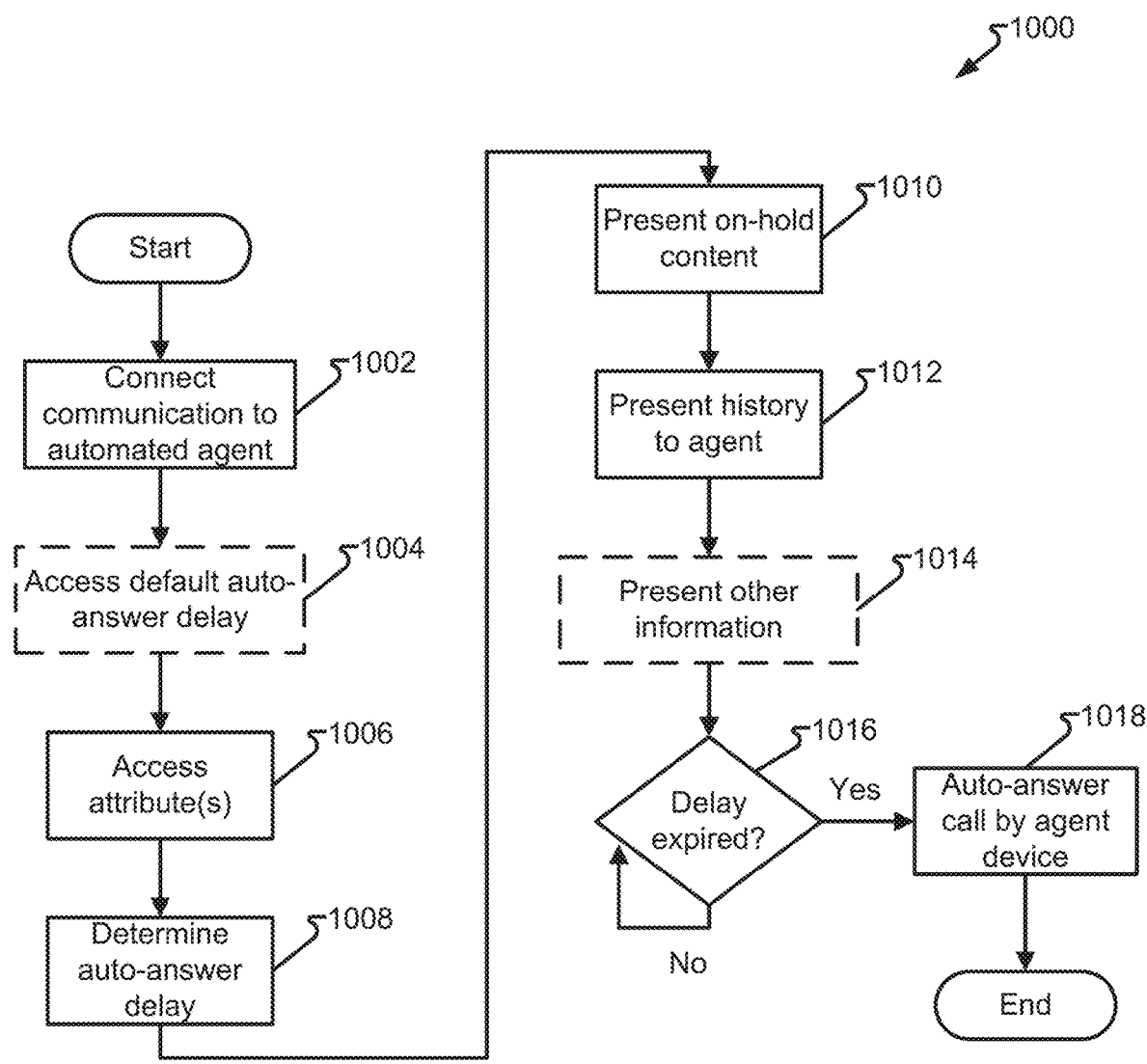
FIG. 10 depicts a process in accordance with embodiments of the present disclosure.

FIG. 10 depicts process 1000 in accordance with embodiments of the present disclosure. In one embodiment, at least one processor, such as at least one processor of server 208 executes instructions comprising process 1000. It should be appreciated that the order of certain steps of process 1000 may be altered or executed in parallel with other certain steps without departing from the scope of the embodiments herein.

Process 1000 beings and step 1002 connects a communication to an automated agent. Step 1002 may answer an incoming call or initiate an out-bound communication. Step 1002 places the call on hold, which may further comprise obtaining information about the communication and/or the customer associated with the communication, such as by receiving responses to an IVR and/or accessing information regarding a history of the call, such as from customer database 118, customer history and/or issue attributes database 212, and/or on-hold content database 210 (e.g., responses to IVR prompts).

Next, step 1004 may optionally access a default value for an auto-answer delay. For example, a certain amount of time may be provided in a default value to allow agents to prepare for the next communication. Accordingly, steps 1006 and 1008 may determine modifications to the default delay. However, if step 1004 is omitted, then steps 1006 and 1008 may determine an absolute value and optionally any modifications to the absolute value for the auto-answer delay.

Step 1006 accesses one or more attributes from one or more of the customer (e.g., from IVR responses), the customer's history (e.g., from entries in customer history and/or issue attributes database 212), a topic or context of the communication (e.g., from IVR responses), the agent selected to be connected to the communication (e.g., from personnel data storage (not shown)), and/or other datum. Next, step 1008 may be determined, such as by at least one processor of server 208 accessing one or more data structures, such as data structures 300-800 associated with the attribute(s) accessed in step 1006. Step 1010 may incorporate, at least in part, step 1006 and/or step 1008, such as to present IVR prompts and receive responses thereto. Additionally or alternatively, step 1010 may present on-hold content, such as music, announcement, count-down timer or announcements, and/or other content. Step 1010 may receive an indication from server 208 and/or agent communication device 206 indicating where agent 204 is in reviewing history/background presentation 214, such as to review a history of customer 202, reference materials, etc. If such information is known, step 1010 may incorporate an associated announcement (e.g., "Agent Smith is reviewing notes and will be connected in thirty seconds.").

Step 1012 presents history and/or optional step 1014 may present other information, such as references, background information, entries in a solutions database, etc. to the agent that will be connected to the communication with the customer. For example, agent 204 may be presented with history/background presentation 214 providing a customer history, issue history, manuals, instructions, etc. for agent 204 to review before being automatically joined to the communication.

Test 1016 determines if the auto-answer delay has expired and, if determined in the negative, continues to loop, and may optionally include continuing and/or updating on-hold content presented to the customer. If test 1016 is determined in the affirmative, the selected agent, via their associated agent communication device, is automatically connected (i.e., answered) at step 1018. As a result, a communication comprising nodes, one customer node (e.g., customer communication device 108) and one agent node (e.g., agent communication device 206) is automatically established, upon expiration of an auto-answer delay, without requiring any human input.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method for automatically connecting a node to a network, comprising:
   connecting a communication with a customer utilizing a customer communication device to a first component via the network, wherein the first component automatically answers the communication and places the communication on hold;
   selecting an agent from a pool of agents to be connected to the communication;
   accessing an auto-answer delay, wherein the auto-answer delay is associated with an attribute of at least one of the customer and the communication to indicate a determined amount of time the agent will be allocated to review a history associated with at least one of the customer and the communication before the communication will be auto-connected with the customer;
   presenting an agent communication device, associated with the agent, with the history; and
   automatically answering the agent communication device with the customer communication device upon expiration of the auto-answer delay.

2. The method of claim 1, wherein the attribute comprises a volume of information contained in the history.

3. The method of claim 2, wherein the attribute further comprises a skill level associated with the agent to assess the volume of information contained in the history.

4. The method of claim 1, wherein the attribute comprises a complexity of the history.

5. The method of claim 4, wherein the attribute further comprises a skill level associated with the agent for the complexity of the history.

6. The method of claim 1, wherein the determined amount of time the agent will be allocated to review the history further comprises updating the determined amount of time the agent will be allocated to review the history upon receiving an indication that the agent has reviewed a portion of the history and wherein the update to the determined amount of time the agent will be allocated to review the history comprises a time the agent utilized to review the portion of the history having a first volume and calculated a time the agent will need to review a remaining portion of the history.

7. The method of claim 1, further comprising, adjusting an on-hold content provided to the customer adjusted in accordance with a time remaining for the agent to review the history.

8. The method of claim 1, wherein the communication is a voice communication.

9. The method of claim 1, wherein the communication is a real-time textual communication.

10. The method of claim 1, wherein the determined amount of time the agent will be allocated to review the history is a variation from a default amount of time allocated to review any history.

11. The method of claim 1, wherein at least one processor accessing instructions to accessing the auto-answer delay further comprise the at least one processor accessing instructions to calculate the auto-answer delay.

12. A system for automatically connecting a node to a network, comprising:
   a communication routing device comprising an interface to the network;
   a server comprising a memory and at least one processor to execute machine-readable instructions;
   an automated communication device; and
   an agent communication device; and
   wherein the communication routing device, upon being connected to a customer communication device via the network, connects a communication to the automated communication device;
   wherein the server selects an agent from a pool of agents to be connected to the communication;
   wherein the server accesses an auto-answer delay, wherein the auto-answer delay is determined by an attribute of at least one of a customer and the communication and indicates a determined amount of time the agent will be allocated to review a history associated with the at least one of the customer and the communication;
   wherein the server presents the agent communication device, associated with the agent, with the history; and
   wherein the server, upon expiration of the auto-answer delay automatically transfers the communication to answer the agent communication device with the customer communication device and disconnects the automated communication device.

13. The system of claim 12, wherein the attribute comprises a volume of information contained in the history.

14. The system of claim 13, wherein the attribute further comprises a skill level associated with the agent to assess the volume of information contained in the history.

15. The system of claim 12, wherein the attribute comprises a complexity of the history.

16. The system of claim 15, wherein the attribute further comprises a skill level associated with the agent for the complexity of the history.

17. The system of claim 12, wherein the communication is a voice communication.

18. The system of claim 12, wherein the communication is a real-time textual communication.

19. The system of claim 12, wherein the at least one processor determines an amount of time the agent will be allocated to review the history further comprises a
   variation from a default amount of time allocated to review any history.

20. A system for automatically connecting a node to a network, comprising:
- means for connecting a communication to an automated communication device, upon being connected to a customer communication device via the network;
- means for selecting an agent from a pool of agents to be connected to the communication;
- means for accessing an auto-answer delay, wherein the auto-answer delay is determined by an attribute of at least one of a customer and the communication and indicates a determined amount of time the agent will be allocated to review a history associated with the at least one of the customer and the communication;
- means for presenting an agent communication device with the history; and
- means for, upon expiration of the auto-answer delay, automatically transferring the communication to answer the agent communication device with the customer communication device and disconnect the automated communication device.

* * * * *